United States Patent [19]

Guha

[11] 3,949,995
[45] Apr. 13, 1976

[54] RECORD PLAYER NEEDLE CONTROL MECHANISM

[75] Inventor: Dwipendra Nath Guha, Huntington, N.Y.

[73] Assignee: Avnet, Inc., New York, N.Y.

[22] Filed: Oct. 21, 1974

[21] Appl. No.: 516,798

[52] U.S. Cl. ............................................. 274/23 R
[51] Int. Cl.² ............................................. G11B 3/10
[58] Field of Search ................................. 274/23 R

[56] References Cited
UNITED STATES PATENTS

| 2,551,506 | 5/1951 | Rockwell | 274/23 R |
| 2,776,144 | 1/1957 | Nichols | 274/23 R |

*Primary Examiner*—Harry N. Haroian
*Attorney, Agent, or Firm*—Johnson, Dienner, Emrich & Wagner

[57] ABSTRACT

In accordance with the present invention two independent controls of the application of the pickup needle to the groove are provided. The first control involves means to overcome the tendency of the needle to skate up and sidewise out of the groove, and the second involves an adjustment of the downward pressure on the needle to keep it fully in contact with the walls of the groove. Two independent influences are required—the first acting generally parallel to or diagonally downward to the plane of the record groove and the second requires an influence acting mainly normal to the plane of the record groove. The two tendencies arise from causes which are independent of each other, and for best reproduction they require independent corrective measures accordingly. Conveniently operable independent controls for each of the above requirements, respectively, are provided in a convenient location on the player, according to the present invention.

6 Claims, 5 Drawing Figures

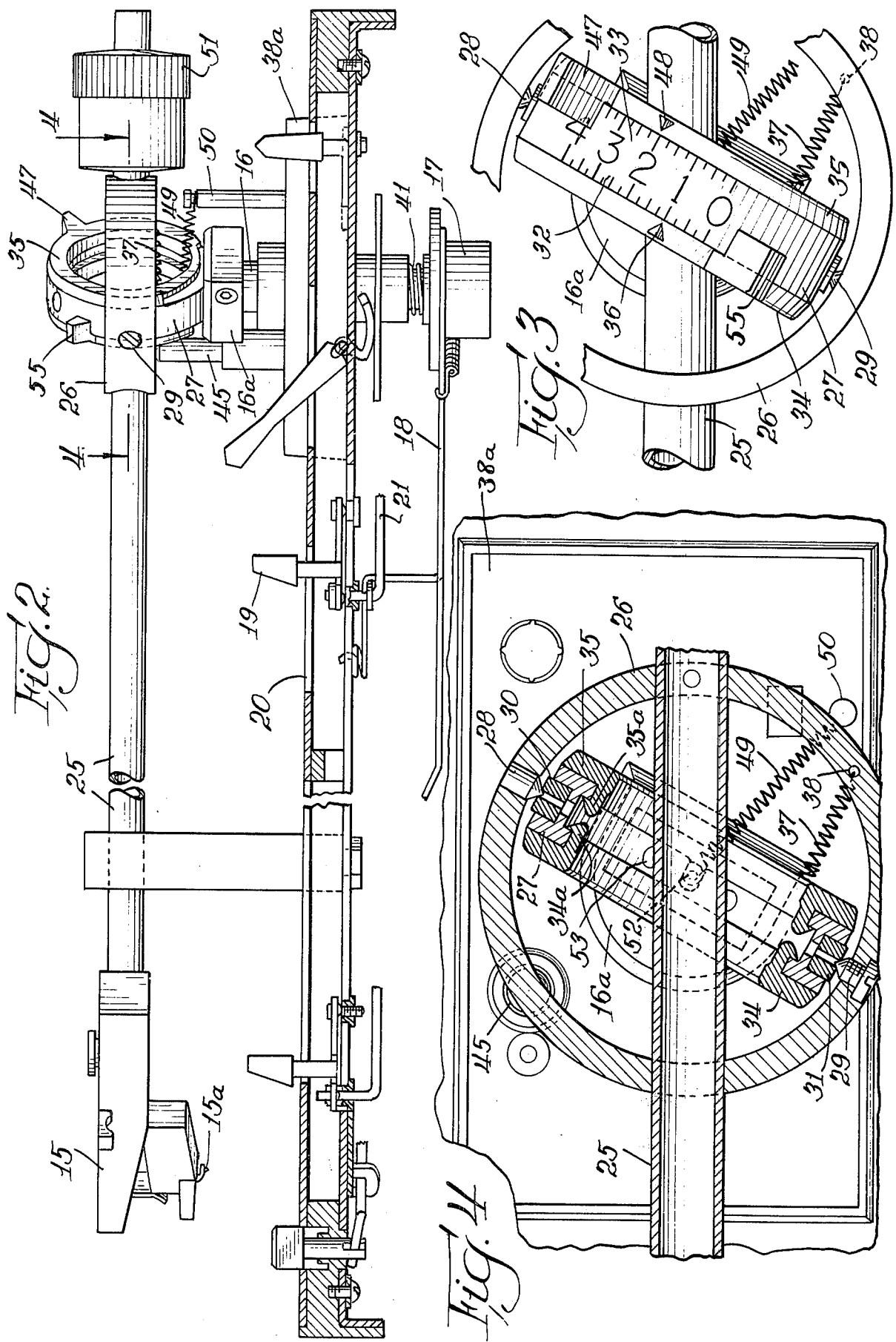

3,949,995

RECORD PLAYER NEEDLE CONTROL MECHANISM

The present invention relates to record players and is concerned with providing the pickup needle with control means for counteracting the tendency of the needle to skate out of the groove, and separate but related control means for applying a graduated pressure of the needle into the groove in order to obtain accurate response of the needle to the groove of the record and thereby produce a more faithful reproduction of the sound which was recorded. The tendency for the needle to skate and the tendency of the needle to fail to fill the groove with proper pressure require separate measures.

Background of the Invention

The intended coaction of the needle and the groove is to have the needle fit closely, i.e., fill, the groove during their relative motion. Any departure or deviation from that ideal reduces or lowers the quality of the reproduction. Thus the needle may bear more heavily on one side of the groove than on the other, and in fact move from greater contact on one side than on the other to the other extreme of bearing more heavily against the other side of the groove.

With the provision of the control of needle pressure of the present invention the needle may be kept down at or close to the bottom of the groove and thereby furnish better reproduction of the recorded sound.

The present invention provides a separate, sensitive control of the pressure down into the groove.

There is also to be taken into account the tendency of the needle to "skate" out of the shorter radius side of the groove. That is due to the geometry of the engaging parts and their relative motion.

As the spiral groove brings the needle closer to the center of rotation of the groove, the angle, at which the wall of the groove engages the needle, changes. The needle tends to climb out of the groove in the direction of the center of the spiral groove. This has two tendencies. The first is to raise the needle out of full contact with the groove and the second is to ride completely out of the groove.

The two separate adjustments of needle control which the present invention provides are designed to counteract or control the two aforesaid tendencies to degrade the quality of sound reproduction. The present invention provides these adjustments in such form, structure and location as to make possible accurate, independent adjustments and with means in the form of graduations for accurately reestablishing such adjustments with minimum disturbance and with convenience, and in a form which is ornamentally attractive.

BRIEF DESCRIPTION OF THE DRAWINGS

FIG. 2 is a sectional view taken on the line 2—2 of FIG. 1;

FIG. 3 is a fragmentary plan view taken from above the top of FIG. 2;

FIG. 4 is a horizontal section taken on the line 4—4 of FIG. 2 looking downward.

DESCRIPTION OF THE PREFERRED EMBODIMENT

The invention provides independent adjustments of spring applied corrective forces to counteract forces which produce imperfect applications of the needle to the groove. Such imperfect application of the needle arises from two main causes, the first and most obvious being lack of pressure of the needle down to maintain intimate contact with both sides of the groove. This requires adjustable control of resilient downward pressure of the needle into the groove to maintain full, intimate contact with minimum over-pressure.

The second cause of imperfect application of the needle to the variations of the groove is the tendency which is developed from the geometry of the needle and the groove, and the angle and direction of incidence at which they meet, for the needle to ride upwardly and inwardly radially of the spiral groove. This is due to an imbalance of lateral forces of the groove upon the needle and tends to cause the needle to ride out of the groove in the direction of the center of rotation of the record.

Figure 1:
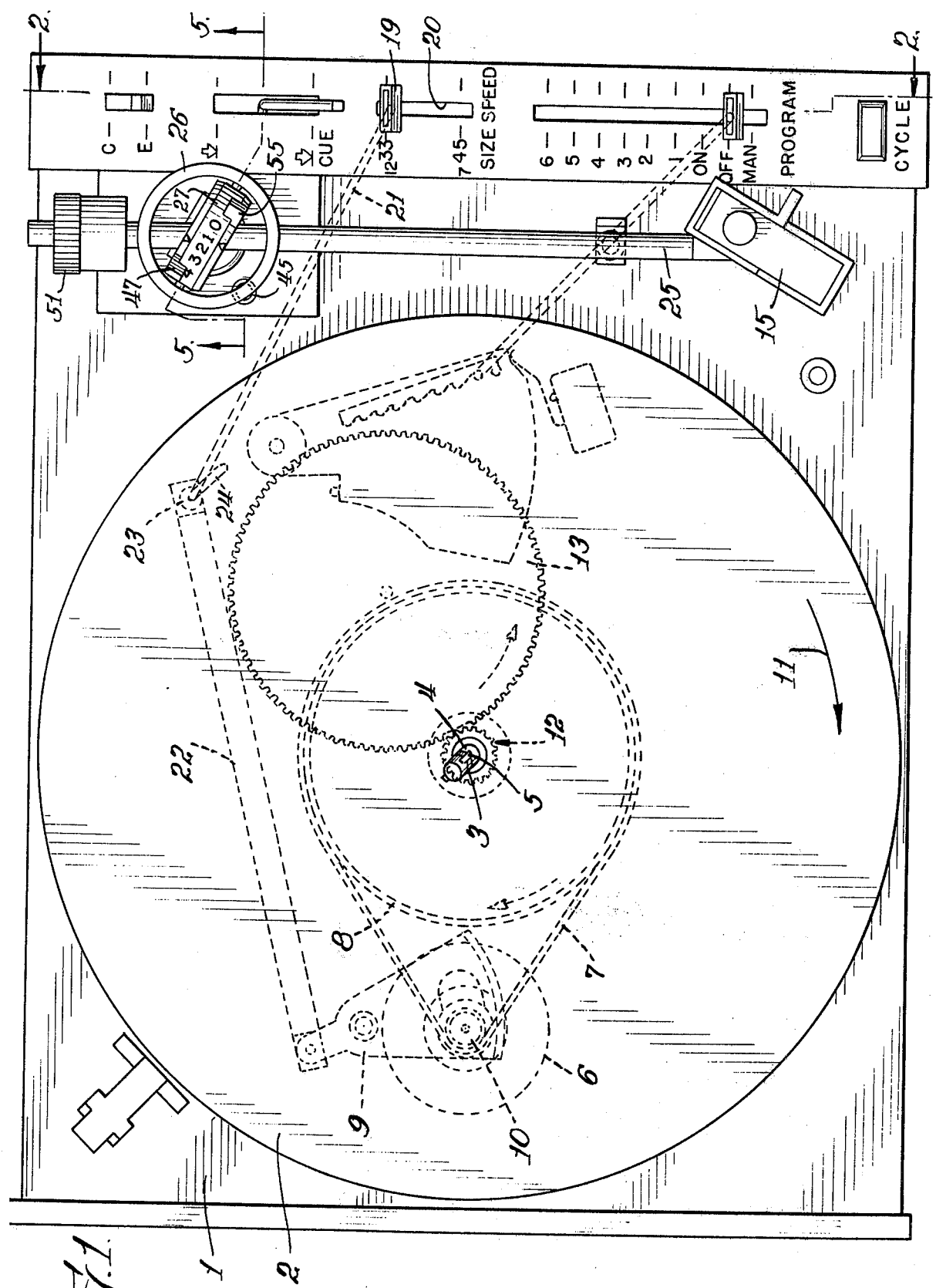
FIG. 1 is a plan view of a record player embodyint the present invention.

Referring now to FIG. 1, the exemplary player in which the present invention is embodied, and which is here illustrated, includes a base plate 1 upon which there is mounted for rotation the turntable 2 suitably carried upon a hollow vertical shaft through which rises the record supporting spindle 3 with a suitable record holding shoulder 4 and pushoff lever 5 for holding and for dropping records successively onto the turntable. The turntable is continuously driven during operation of the player by motor 6 through an elastic belt 7 trained over a drum 8 fastened upon the lower side of the turntable 2. The motor 6 has a shaft bearing a pulley 10, said pulley having two different diameters and a speed-changer comprising a belt shifting lever 9 for shifting the belt from one diameter of pulley 10 to the other, and vice versa, for driving the turntable 2 at either of two different speeds for 7 inches and 12 inches records respectively.

The turntable 2 which is rotated in the clockwise direction, as indicated by the arrow 11 in FIG. 1, has a pinion 12 below the baseplate, which pinion drives the rotary cam gear 13 with the cams not here shown but disclosed in my copending application Ser. No. 519,867, filed Nov. 1, 1974. The rotary cam (not here shown) which is carried by the cam gear 13 operates the record feeding means 5 at the beginning of each playing cycle and causes proper manipulation of the tone arm to move it from the position shown in FIG. 1 into register with the outermost groove of the particular record which is deposited on the turntable 2 by the spindle 3. At the same time the cam, carried by the gear 13, manipulates the vertical tone arm shaft 16 through rotation of the friction drum 17 (see FIG. 2). The foregoing elements are illustrated and described in my copending application Ser. No. 519,867, filed Nov. 1, 1974. These elements operate in conjunction with the structure and mode of operation of the tone arm 25 and its adjuncts and adjustments which constitute the claimed subject matter of the present application.

The shoe 42 (FIG. 5) swung on an arc tangent to the drum 17 imparts appropriate rolling motion to the drum 17 at the proper point in the cycle of operations and the tone arm shaft 16 is moved angularly. The shaft 16, which supports the tone arm and its adjustments, is connected to a stop arm 18 (FIGS. 2 and 5) adapted to stop for lowering the tone arm 25 in one or the other of its registering positions for cooperation with a 12 inches 33 rpm record or a 7 inches 45 rpm record in accordance with the setting of the control button 19 (FIG. 1) riding in the slot 20 in the base plate 1 and operating through the link 21 and bar 22 which operate the belt shifter 9 to produce the speed of the turntable to correspond with the specific size of record which is stacked to be played.

The link 21 is connected to the bar 22 (FIG. 1) through the pin 23 which rides in a slot 24 in the base plate 1. The pin 23 by its position at one end, or the other, of the slot 24 determines the angle through which the tone arm 25 is moved from rest position to register the needle 15a with the first groove of the record of the size selected, the needle position depending upon whether the records selected are 12 inches 33 rpm or 7 inches 45 rpm records.

Control of the swingout angle of the tone arm 25 from rest position shown in FIG. 1 to the first groove of the selected size of record is determined by a stop which is positioned selectively according to the position of the pin 23 (see FIG. 1). Thus adjustment of the button 19 produces adjustment of the speed of the turntable and simultaneously determines the setdown radius of the needle to correspond to the setting of the button 19 to control the swingout of the tone arm to correct angular position to bring the pickup needle into register with the outermost groove of the record of the size selected.

THE TONE ARM MOUNTING

The tone arm 25 is mounted in a pair of gimbal rings 26 and 27; said tone arm projects diametrically through and is carried by the outer gimbal ring 26. The outer gimbal ring 26 is pivoted on a pair of conical pins 28, 29 which project horizontally from the outer gimbal ring 26 into bearings 30 and 31 which are seated diametrically opposite each other in the inner gimbal ring 27. The uppermost part of the inner ring 27 (see FIG. 3) is provided with graduations 32 on one edge, and the same graduations are duplicated on the opposite edge of ring 27 at 33. Numerals of a size to be readily seen are disposed on gimbal ring 27 between the two sets of graduations 32, 33 and serve to indicate numerically the angular position of the corresponding rings 34, 35 and thereby the relative tension of the connected springs as shown by the indicating pointers 36 and 48. On its back side the ring 34 (see FIG. 4) has hooks 34a by which said ring is mounted rotatably in a groove on the inner periphery of gimbal ring 27 (see FIG. 4). The needle force ring 34 has a fingerpiece 55 and a pointer 36 for adjusting the pressure of the needle downwardly in the groove of the record by stretching the spring 37 upon moving the fingerpiece 55 and pointer 36 to a higher numerical value on scale 32 (see FIG. 3). The spring 37 is anchored at its inner end—that is, the end furthest from the pickup end of the tone arm—to the lower margin of the ring 26 at the point 38 (see FIGS. 4 and 5). This point 38 of attachment of the spring 37 is below the center of the pivots 28, 29 of the outer gimbal ring 26 which carries the tone arm 25, as may be seen in FIG. 5, and tends to depress the needle into the groove—that is, to move it downwardly.

Figure 5:
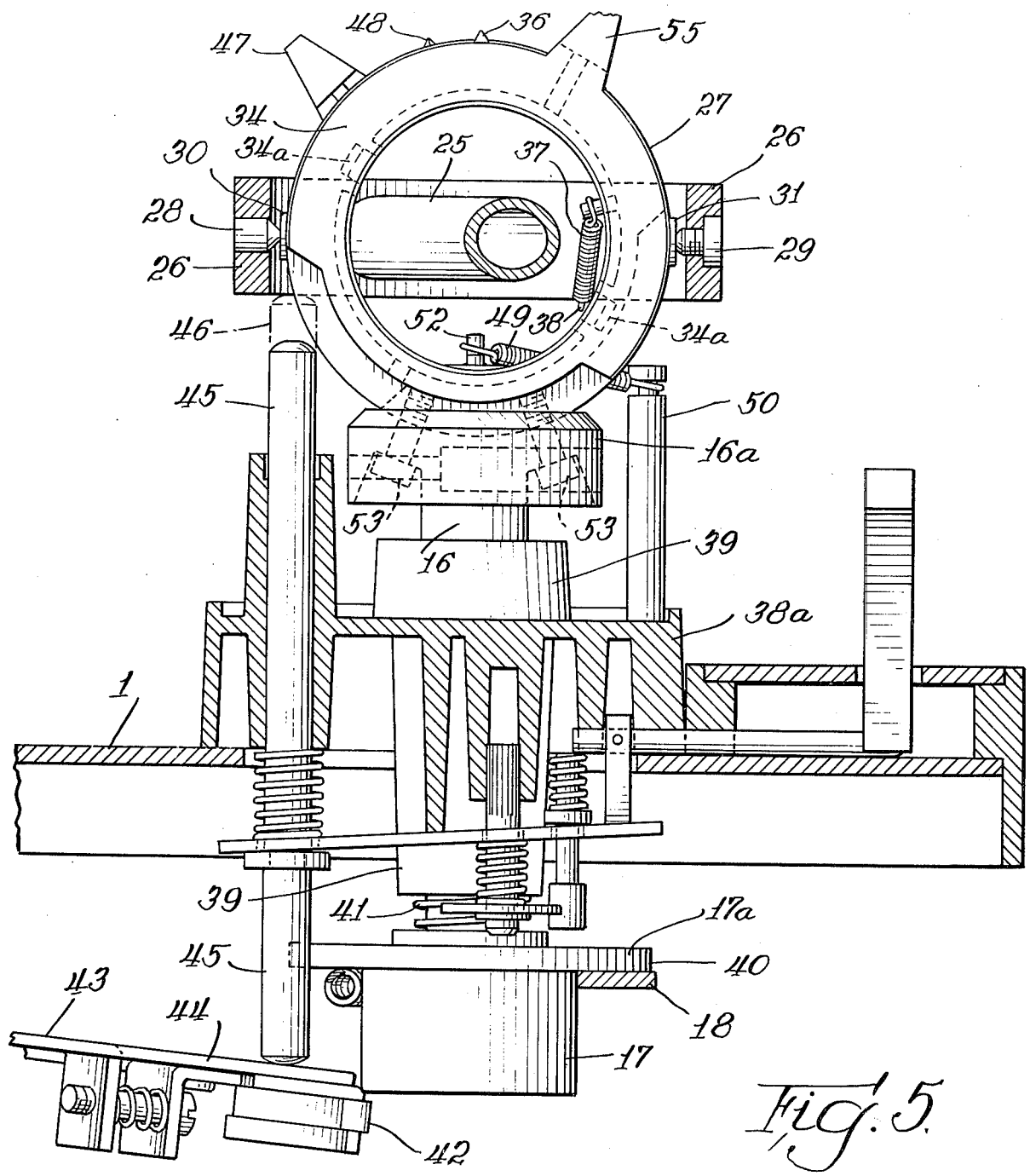
FIG. 5 is a cross sectional view taken on the line 5—5 of FIG. 1 looking in the direction of the arrows, i.e, upwardly in FIG. 1.

The vertical tone arm supporting shaft 16 (see FIG. 5) is mounted in the rectangular tone arm base 38a which in turn is mounted upon the base plate 1 (said base 38a is shown in the upper righthand corner of FIG. 1 and the righthand end of FIG. 2). The vertical shaft 16, upon the upper end of which the tone arm and its adjuncts are mounted, extends down through the baseplate 1 (FIG. 5). Said shaft 16 carries at its lower end (below the bearing sleeve 39 which forms a part of the baseplate 1), for swinging the tone arm, a friction drum 17 which is attached to the lower end of said shaft 16. A compression spring 41 disposed between the sleeve 39 and flange 17a, which forms the upper end of said drum 40, resists upward displacement of the shaft 16 and its connected parts.

The friction drum 17 is adapted to be engaged by a friction shoe 42 which is actuated (see FIG. 5) by operation of the control cam (not shown) carried by the gear wheel 13 (see FIG. 1), which cam governs successive playings.

An arm 43 pivoted on the lower side of the baseplate 1 is operated by the control cam on the gear wheel 13 to push up the plunger 45 which extends through the base 38 and is projected endwise as indicated in dotted lines at 46 in FIG. 5. The thrust of the plunger 45 swings the tone arm 25 and pickup 15 upwardly on pivots 28, 29 (FIG. 4). The control cam on the gear wheel 13 operates, first to thrust the elevating pin 45 against the ring 26, on the side of the pivotal mounting, towards the pickup 15 (see FIG. 1). This operation swings the tone arm with the pickup 15 upwardly.

The cam control thereafter swings the friction shoe 42 against the drum 17 thereby turning shaft 16 and the gimbal ring 26 which is connected to the tone arm 25 to swing the pickup 15 which is above the level of the record on the turntable to register with the first groove of the record. The plate 44 is then lowered allowing the gimbal ring 26 to allow the pickup needle 15a to lower into said first groove.

In the course of operation of the cam on the gear wheel 13, the initial action of pushing up the elevating pin 45 against the gimbal ring 26 to raise the tone arm is followed by application of the friction drive shoe 42 to the drum 17 to swing the shaft 16 and the gimbal ring 26 in a direction to bring the pickup needle over the first groove of the top record on the turntable. The said action of swinging the pickup over the turntable to put the needle in the first groove of the record to be played is followed by lowering of the plate 44 and pin 45 to allow the tone arm to swing downwardly to apply the needle to the first groove in the record to be played. The outer gimbal ring 26 shown in horizontal or rest position in the drawings (see FIG. 2) is carried on its pivot pins 28, 29 disposed in a line constituting its diagonal horizontal axis of rotation for up and down component of motion of the pickup. The gimbal ring 27 (see FIG. 4) comprises an inner ring which is mounted on the head 16a of the vertical tone arm shaft 16 (see FIG. 5), said ring 27 having its vertical plane disposed at approximately 60° angle to the vertical plane of the tone arm 25.

ADJUSTMENT OF THE NEEDLE PRESSURE INTO THE GROOVE

The overall weighting of the needle 15a into the groove is roughly regulated by the counterweight 51, but the nicety of overall pressure of the needle into the groove to develop full contact is left to the needle force control spring adjustment and the resiliency of the pickup.

The needle in the moving groove, unless its downward force is nicely regulated, tends to assume a position of partial compliance which fails to realize the full record contained in the groove. The needle should be caused to follow the groove variations by a sensitivity of pressure nicer than that provided by the counterweight adjustment.

By the present invention a needle force adjustment of greater sensitivity than that of the adjustable counterweight is provided by the needle force adjustment ring 34 and tension spring 37. It serves the function of keeping the needle more fully in engagement with both sides of the groove than the counterweight is able to do, and hence it gives superior rendition of the record.

The inner end of the tubular tone arm 25 extends diametrically through and is fixed in the outer gimbal ring 26 and said tone arm carries on its rear end an adjustable counterweight 51 to counterbalance the arm and pickup 15.

The outer gimbal ring 26 is wide enough vertically to permit projecting the tone arm diametrically through its front and back walls as shown in FIGS. 2, 3 and 4. The said outer gimbal ring 26 with the tone arm 25 and pickup 15 is pivoted on a diagonal horizontal axis on the pins 28, 29 which serve as pivots for the cooperating bearings 30 and 31 that are mounted in the vertical gimbal ring 27, which ring 27 is fixed by screws 53 (FIG. 5) to the head 16a of the vertical tone arm shaft 16 (FIG. 5).

BIASING MEANS FOR ANTI-SKATE

The needle has a built in tendency to skate up and out of the groove toward the center of the record. In order to counteract this tendency, a force is developed by the present invention to provide a counterpressure urging the needle outwardly away from the center of the record and downwardly into the groove whereby to counteract the tendency of the needle to skate out of the groove and towards the center of the turntable. For this purpose the outer end of the coiled tension spring 49 is hitched (see FIG. 5) to the stationary post 50 substantially on a level with the attachment of the other end of the spring 49 to the lower portion of ring 34 through a post 52 attached to said anti-skate ring 34 (see FIGS. 4 and 5) and the inner end is hitched to the pin 52 at a level below the horizontal axis of the pivot pins 28, 29 whereby the tone arm is biased to push the needle down into the groove and radially outwardly from the center of the record. The force of the spring 49 may be apportioned between the downward component of force of the spring 49 and the radial component of force of said spring 49 by a manipulation of the fingerpiece 47.

ANTI-SKATE ADJUSTMENT

The outer gimbal ring 26 shown in plan view in FIGS. 1, 3 and 4 is provided with means designed to oppose the tendency of the needle to skate out of the record groove in a lateral direction approximately radially toward the center of the record being played. This tendency to ride sidewise out of the groove is counteracted in the present structure by the spring 49 attached to the anti-skate control ring 34 which has a fingerpiece 47 and an index pointer 48 playing along the edge of the scale 33 on the cylindrical outer surface of the gimbal ring 27.

The same index chart 32 with numerals and subdivisions is utilized in common by both index pointers 36 and 48 for needle force control and for anti-skate control respectively.

The tension spring 49 is attached at its anchor or outer end to stationary post 50 (see FIG. 4) mounted on the base 38a and connects the stationary post 50 to the hook 52 on the inside of the anti-skate ring 35. The inner movable end of the spring 49 is hitched to the post or hook 52 attached to the vertical gimbal ring 27 (FIGS. 4 and 5).

It is to be noted that the inner, vertically disposed gimbal ring 27 is fixed to the tone arm supporting shaft 16 in the base 38a by screws 53-53. The gimbal ring 27 supports the rotatably mounted and adjustable finger pieces 35 and 47 by which there is effected the spring loading of the tone arm to overcome the tendency of the needle to skate laterally, and the tendency to fail to ride to the bottom of the groove respectively.

SUPPORT OF THE GIMBAL RINGS

The horizontally disposed gimbal ring 26 is adapted to be tipped on the axis of the pivot pins 28, 28 for raising and lowering the pickup 15. A counterbalance weight 51 is adjustable lengthwise of the tone arm to put the tone arm in balance, or with such pressure of the needle, into the groove as may be desired. Upward movement of the lifting pin 45 causes engagement of the pin with the lower surface of the front part of the horizontal gimbal ring 26 pivoted on its supporting pivots 28, 29. This motion of raising the needle is opposed by the spring 37 and exerts a corresponding tension on the spring 37 through corresponding adjustment of the ring 34 on the pivoted gimbal ring 27. This places a greater constant tension on the spring 37 tending to hold the needle more fully and firmly in the groove. The adjustment for overcoming the tendency of the needle to skate sidewise out of the groove is provided by changing the tension of the anti-skate spring 49 by angular shifting of the fingerpiece 47 on the ring 34.

I claim:

1. In a record player, a baseplate (1), a turntable (2) having a vertical tone arm supporting shaft (16) journaled in said baseplate, a horizontally disposed tone arm (25) having a pickup (15) with needle (15a) on the outer end of said tone arm, a pair of gimbal rings (26, 27) connecting said tone arm supporting shaft and said tone arm, and comprising an inner gimbal ring (27) lying in a generally vertical plane and being mounted on the upper end of said tone arm shaft (16) and an outer gimbal ring (26) embracing said inner ring (27) and being supported on the inner ring (27) on bearings (28, 29) disposed in the outer ring (26) on a horizontal axis diagonal to the axis of the tone arm (25) whereby said tone arm (25) may be swung horizontally on said vertical tone arm shaft (16) and may swing vertically on said horizontal axis (28, 29), a needle pressure control ring (35) mounted on the side of the inner gimbal ring (27) which faces away from the pickup, said control ring (35) being rotatable on the side of the inner gimbal ring (27) facing away from the pickup, a needle pressure control spring (49) connected between said control ring (34) and the base plate (38a), said control ring (34) being rotatable on its mounting (34a) on said inner gimbal ring (27) to control the tension of the spring (49) and thereby the downward pressure of the pickup needle (15a) in the groove.

2. The combination of claim 1 wherein the inner gimbal ring (27) has an internal groove with substantially radial sidewalls and said needle pressure control ring 34 has an outer periphery substantially flush with the peripheral edge of the inner gimbal ring (27), said needle pressure controlling ring (34) having hooks extending into said groove, a zero indication on the outer periphery (33) of said ring (27) and graduations (32) on the adjacent periphery of the inner gimbal ring (27), and a finger piece (55) on said gimbal ring (34) for rotating the ring to alter the adjustment of the force of the spring (37), said adjustment being indicated on the graduations on the inner gimbal ring.

3. In a record player a baseplate (38a), a turntable (2) having a vertical shaft journaled in said baseplate, a substantially horizontally disposed tone arm (25) having a pickup with needle (15a), a vertical tone arm shaft (16) journaled in said baseplate (38a), a pair of gimbal rings (26, 27) comprising an inner ring (27) mounted in a vertical plane on said tone arm shaft (16), and an outer ring (26) mounted in a horizontal plane on said inner gimbal ring and supporting said tone arm, said tone arm extending longitudinally through the vertical gimbal ring (27) and being fixed in said horizontal gimbal ring (26), a stationary spring anchor (50) connected with the baseplate (38a) an anti-skate force spring (49) connecting said spring anchor (50) and said antiskate adjustment ring, said inner gimbal ring (27) comprising an internal groove adjacent the edge of the ring which faces the tone arm, and an anti-skate adjustment ring (35) having a plurality of hooks (35a) riding in said groove and maintaining said anti-skate adjustment ring (35) in registration with the outer surface of the inner gimbal ring, an anti-skate force spring (49) connecting said spring anchor (50) and said anti-skate force adjustment ring (35), an indicator (48) carried on the anti-skate force adjustment ring (35), graduations (32, 33) on the periphery of the inner gimbal ring (27), a finger piece (47) for rotating said anti-skate adjustment ring (35) on said inner gimbal ring (27), and moving said indicator relative to said graduations on the inner gimbal ring (27) and tensioning the anti-skate spring (49) to a resilient force upon the needle in a direction including a force component sideways inwardly of the groove.

4. The combination of claim 3 wherein the adjustment of the position of the movable end of said spring (49) by said fingerpiece controls the direction and tension of the said spring (49) on the tone arm thereby counteracting the tendency of the needle to skate out of the groove.

5. Means for counteracting the tendency of the needle of a record player to skate laterally out of the groove of the record during playing of the record and simultaneously resiliently depressing the needle in the groove, comprising a tone arm (25) carrying a pickup needle (15a) at its outer end, a vertically disposed tone arm shaft (16), a pair of gimbal rings (26, 27) connecting the tone arm shaft (16) and the tone arm (25), said gimbal rings (26, 27) comprising an inner gimbal ring (27) mounted in a vertical plane on said vertical tone arm shaft (16) an outer substantially horizontal gimbal ring (26) pivoted diagonally with respect to the axis of the tone arm (25) on and to the inner gimbal ring (27) and carrying the tone arm (25), a tension spring anchor (50) mounted on the baseplate substantially at the level of the lower part of the inner gimbal ring (26), a needle pressure control spring (37) attached at one end to said anchor (50), the other end of spring (37) being attached to tension adjustment ring (34) which is rotatable on gimbal ring (27) whereby the tension of said spring (37) may be regulated to control the lateral needle pressure in the groove of a cooperating record, said inner gimbal ring (27) having also an angularly adjustable spring tensioning ring (35), there being an anchor (38) for said spring (37) on the outer gimbal ring (26), a tension spring (49) extending from said spring anchor (50) to the lower portion of the inner gimbal ring (27) which carries the tone arm, and said tension spring (49) being attached to the spring adjusting ring adjacent to the lower portion of said gimbal ring, whereby rotation of the gimbal ring (34) pulls the free end of the tension spring vertically to press the needle into the groove.

6. Means for counteracting the tendency of the needle of a record player to skate laterally out of the groove of the record during playing of the record, comprising a tone arm (25) carrying a pickup needle (15a) at its outer end, a vertically disposed tone arm supporting shaft (16), a pair of gimbal rings (26, 27) connecting the tone arm shaft (16) and the tone arm (25), said gimbal rings comprising an inner gimbal ring (27) mounted in a vertical plane of said vertical tone arm shaft (16), an outer horizontal gimbal ring 26 pivoted on the inner gimbal ring (27) and carrying the tone arm (25) and being disposed substantially horizontally, a stationary tension spring anchor (50) for one end of said tension spring (49), the other end of said tension spring (49) being attached to movably tension adjustment ring (35), said ring (35) being coaxial with and mounted rotatably on said inner gimbal ring (27).

* * * * *